Figure 1:
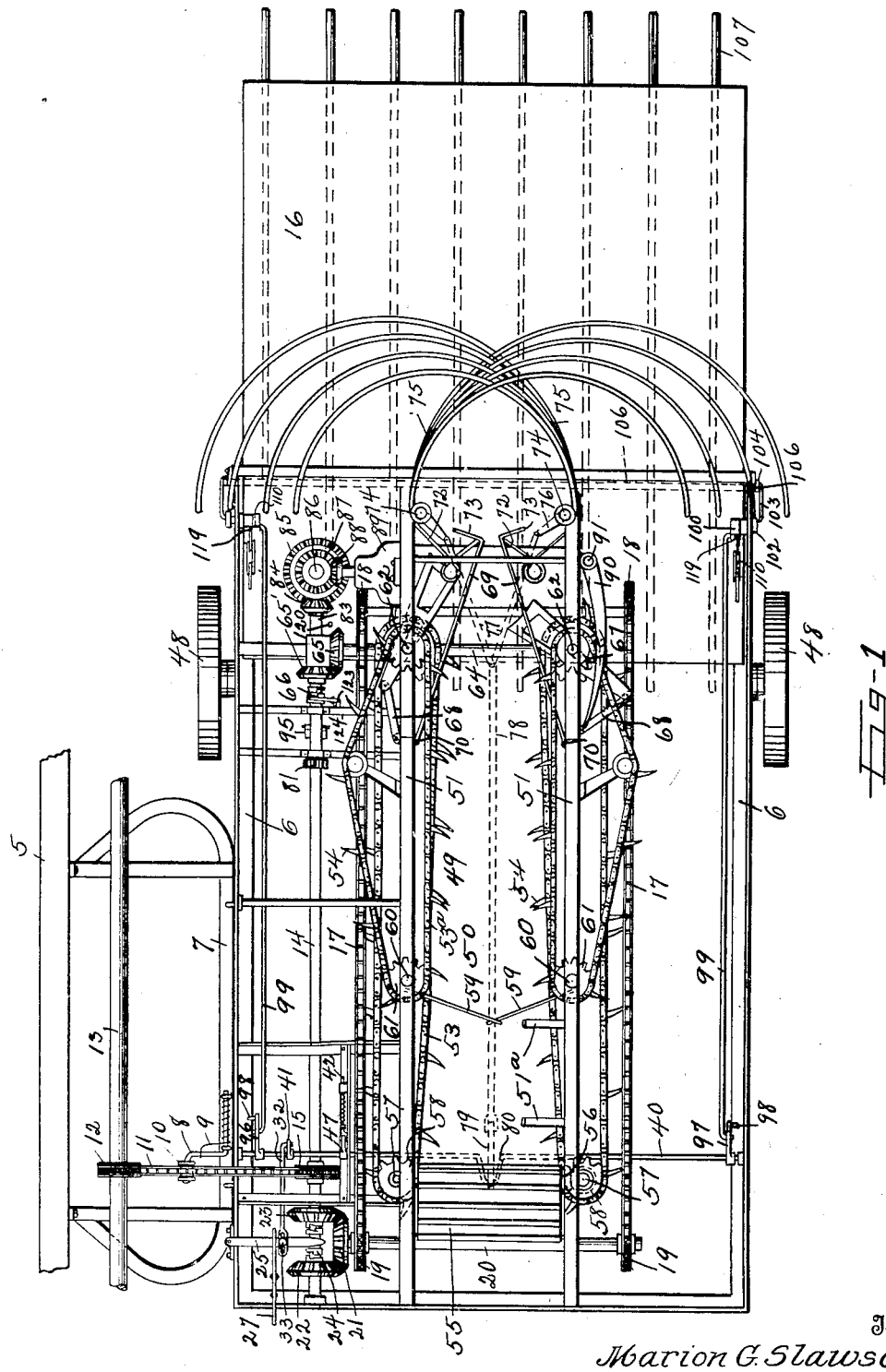

M. G. SLAWSON.
GRAIN SHOCKER.
APPLICATION FILED FEB. 27, 1913.

1,198,285.

Patented Sept. 12, 1916.
5 SHEETS—SHEET 1.

Witnesses
O. M. Smith
A. M. Murray

Inventor
Marion G. Slawson
By Shepherd & Campbell
his Attorneys

M. G. SLAWSON.
GRAIN SHOCKER.
APPLICATION FILED FEB. 27, 1913.
1,198,285.
Patented Sept. 12, 1916.
5 SHEETS—SHEET 2.
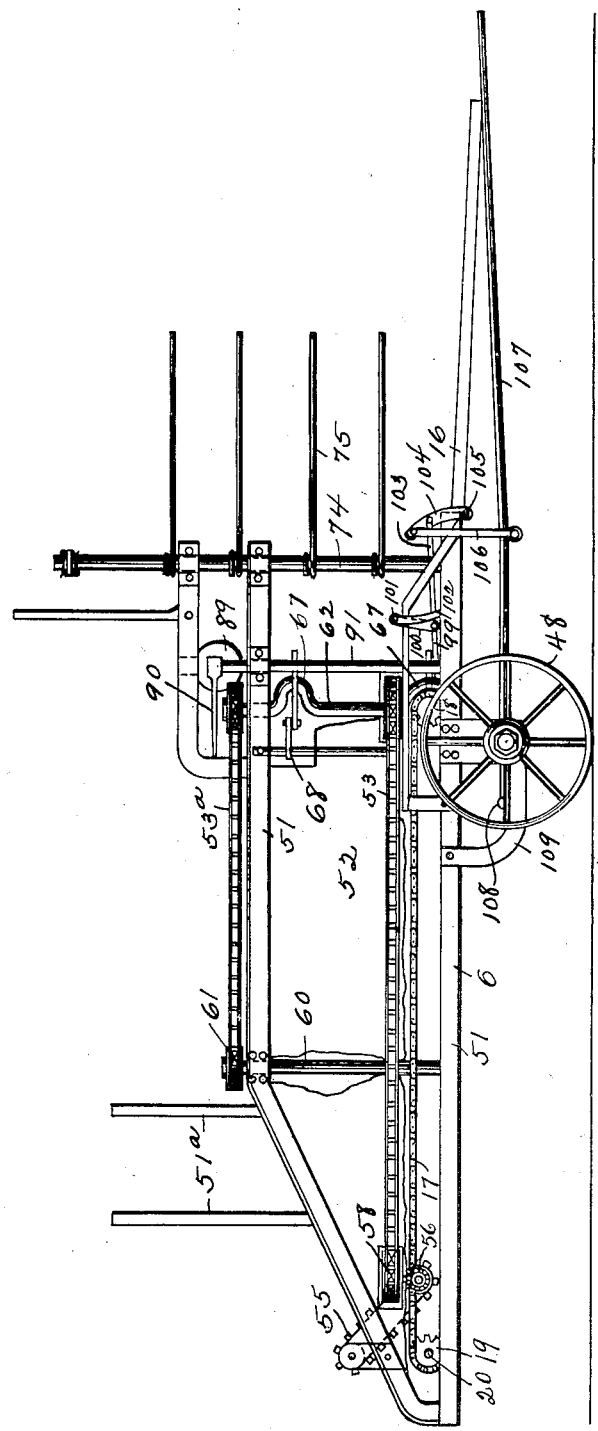

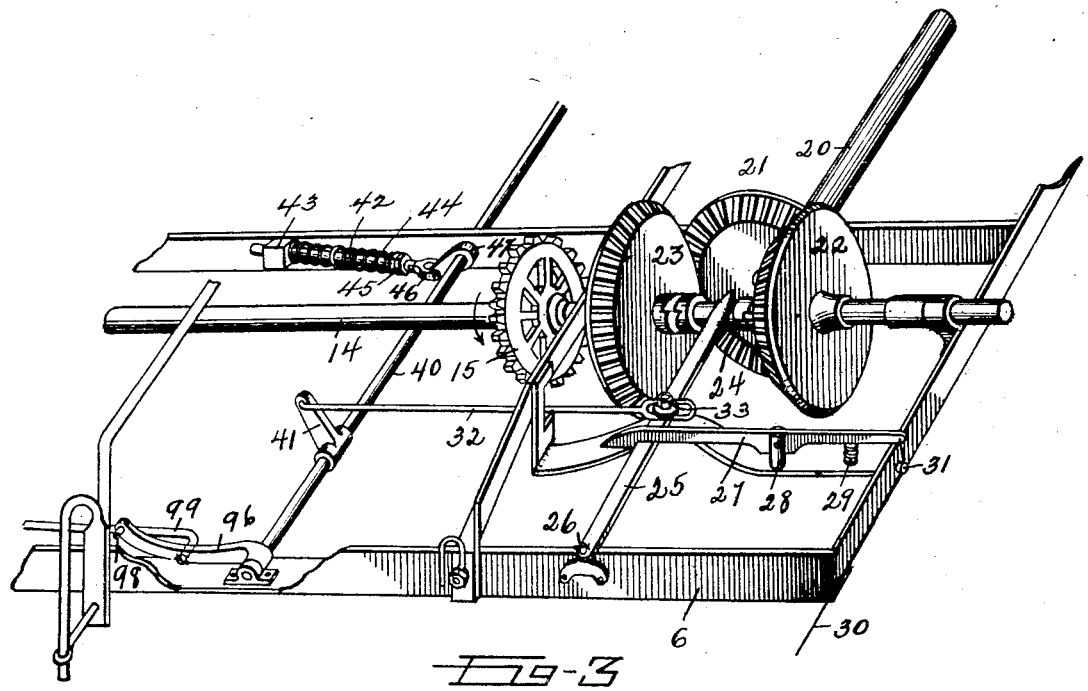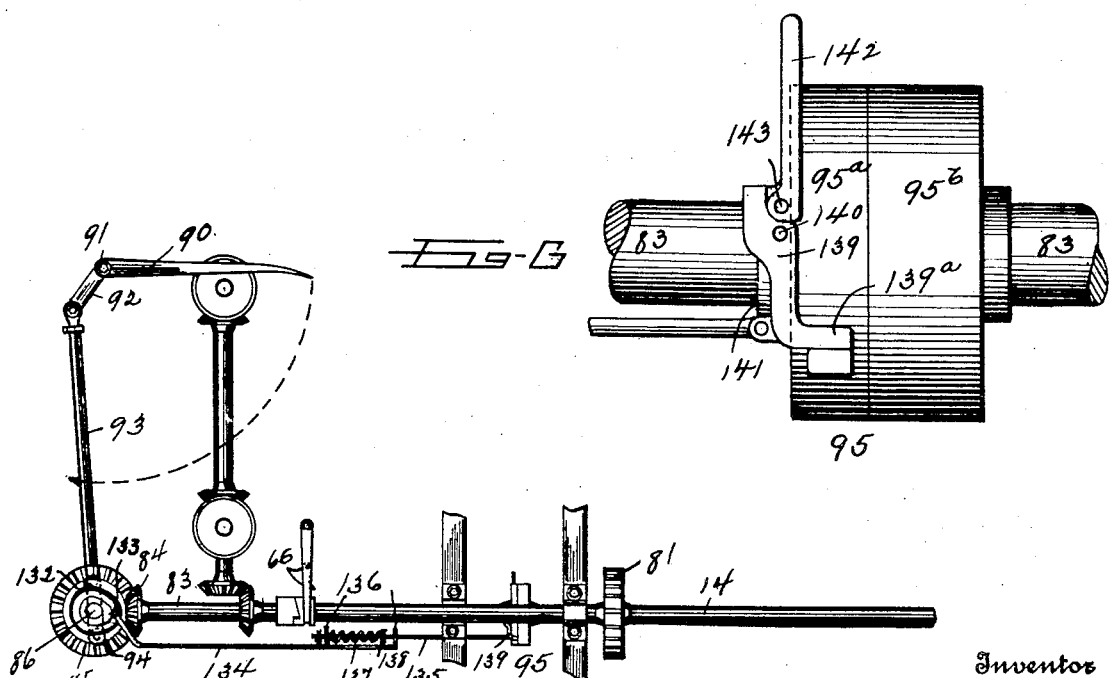

M. G. SLAWSON.
GRAIN SHOCKER.
APPLICATION FILED FEB. 27, 1913.
1,198,285.
Patented Sept. 12, 1916.
5 SHEETS—SHEET 4.
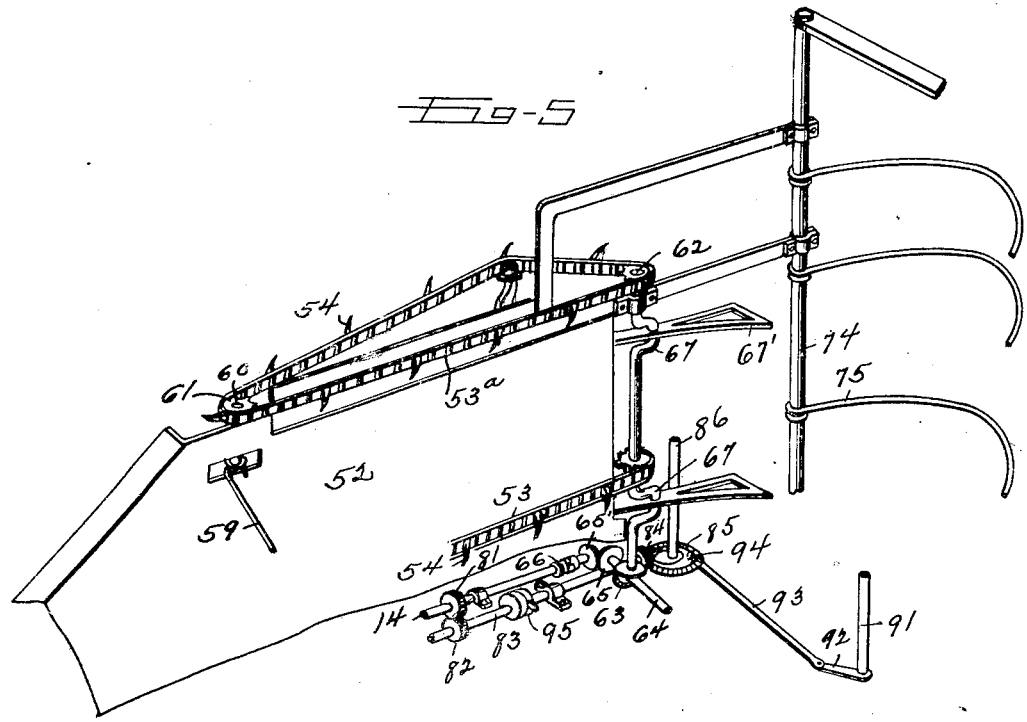
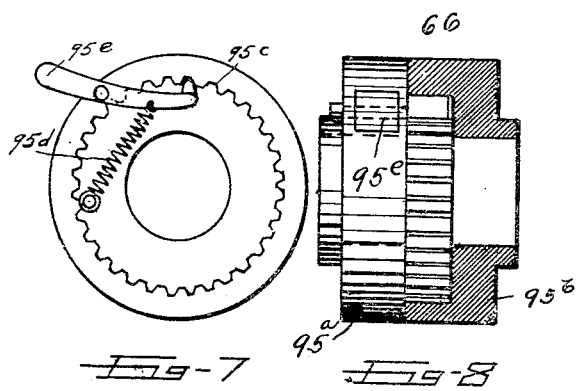
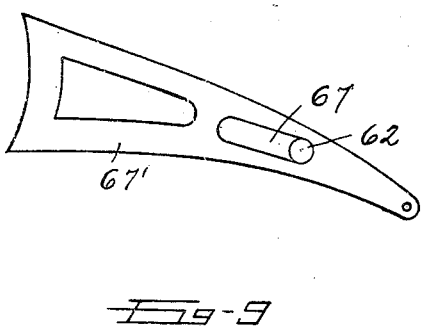
Witnesses
Inventor
Marion G. Slawson
By Shepherd Campbell
Attorneys M. G. SLAWSON.
GRAIN SHOCKER.
APPLICATION FILED FEB. 27, 1913.
1,198,285.
Patented Sept. 12, 1916.
5 SHEETS—SHEET 5.
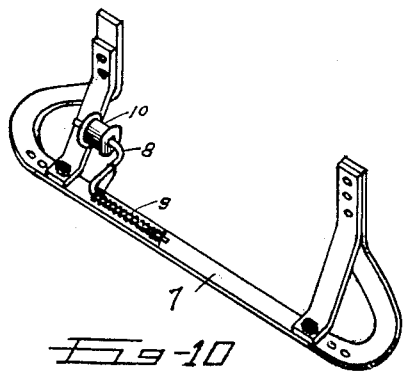
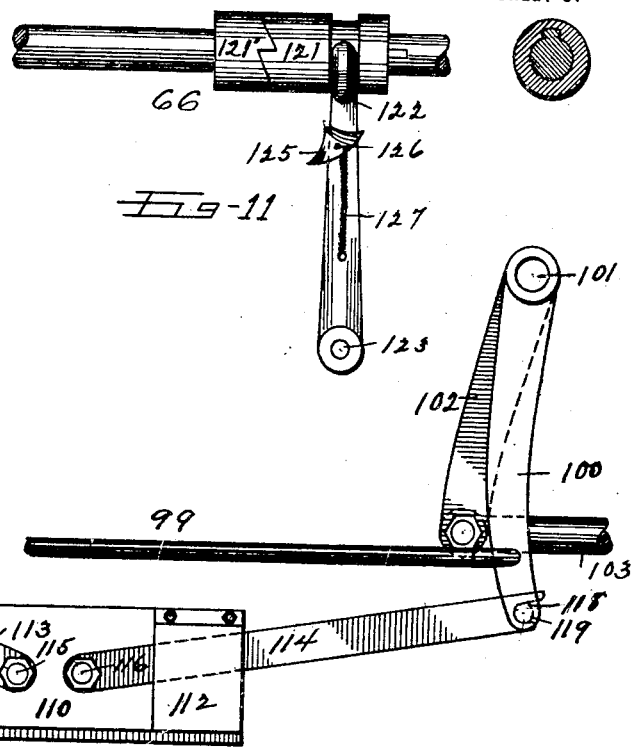
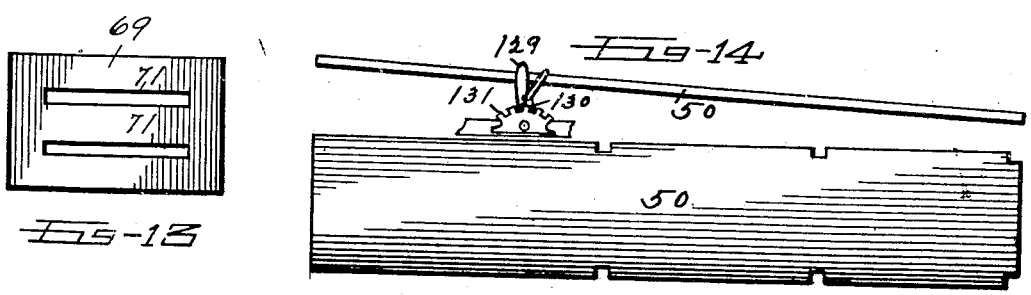
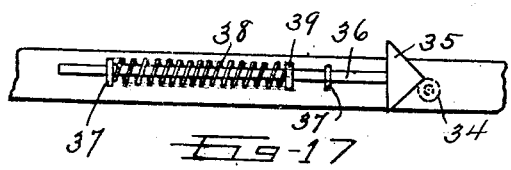
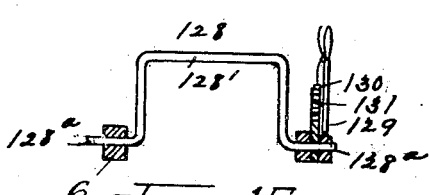
Inventor
Marion G. Slawson
By Shepherd Campbell
Attorneys
Witnesses

UNITED STATES PATENT OFFICE.

MARION G. SLAWSON, OF GIRARD, KANSAS.

GRAIN-SHOCKER.

1,198,285.  Specification of Letters Patent.  Patented Sept. 12, 1916.

Application filed February 27, 1913. Serial No. 751,075.

*To all whom it may concern:*

Be it known that I, MARION G. SLAWSON, a citizen of the United States of America, residing at Girard, in the county of Crawford and State of Kansas, have invented certain new and useful Improvements in Grain-Shockers, of which the following is a specification.

This invention relates to grain shockers of a type adapted to be secured to and to travel with a grain binder of the usual construction, said shocker receiving the bound bundles of grain from the binder, retaining said bundles until the desired number have been collected and then depositing said bundles in the form of a shock upon the ground. Broadly speaking these objects are attained by a structure comprising a frame in which a table is slidably mounted, together with means for conducting the bundles of grain to said table, shock forming arms or fingers for retaining the bundles in an upright position upon said table, means for causing the table to move into the frame and from beneath said bundles at the will of the driver; fingers for supporting the bundles when the table is withdrawn from beneath them, and automatic means for dropping said fingers and opening the shock forming arms when the table reaches its limit of movement toward the front of the machine.

The shocker herein shown and described is somewhat similar in construction to that shown in my prior patent #985,750, issued on February 28, 1911, but it comprises certain improvements and additions thereto that are of the utmost importance and which I have found to be of a high degree of utility.

These improvements comprise, among other things, alternately acting sets of packers which have a longitudinal reciprocation imparted to them, said packers being disposed adjacent the entrance to the shock forming arms, and acting to crowd the bundles into the shocker by getting in front of the bundles and pushing them rearwardly. The packers upon the opposite sides of the machine alternate in this packing action and thereby create a tight and well formed shock. I also employ a binding apparatus in conjunction with the shocker, this binding apparatus serving to tie a string around the top of the shock. Furthermore, in the present structure, I have arranged a trip clutch in such position that it will be actuated when the table starts out from beneath the shock and into the frame of the machine, this action disconnecting the packers and the chains which carry the bundles rearwardly from their driving elements, so that at this time, the packers and chains are stopped and no bundles will be carried through into the shock forming arms when said arms are in open position when setting out the completed shock. The movement of the table to its shock supporting position, serves to actuate this clutch to again establish connection between the chains and packers and their driving elements, so that these members are set in operation to carry the bundles rearwardly and to compress the bundles into the shock.

Means are provided for preventing the bundles from falling over until the chains properly engage them and a butter has been provided to carry the butts of the bundles down into engagement with the bottom chains, these bottom chains being slightly divergent at their forward ends to form a "throat" to permit of the ready engagement of the butts by said chains.

It is a further object of this invention to provide a bottom board for the passageway for the bundles during their rearward travel, together with means for varying and adjusting the inclination of said board so that it may be raised or lowered as needed to handle the different lengths of straw.

Means are provided for preventing the bundles from the binder from being discharged over the top of the shocker.

Improved mechanism has been provided for lowering the shock supporting fingers in such manner that the shock is dropped squarely upon its butt into the stubble, the butt of each and every bundle striking the ground at exactly the same time and at the exact time that it is released by the shock forming arms. This action is controlled by the driver of the binder so that the shocks are set in straight rows across the field.

All of the shockers now made, with which I am familiar, are so constructed that they will discharge the shock at any time when there is sufficient weight or pressure upon the cradle or shock forming arms.

My invention further contemplates the provision of improved means for attaching the shocker to the binder and for taking up lost motion within the driving element between the shocker and the binder.

My improved structure further contemplates the provision of hinged, spring actuated plates disposed within the passageway and slotted to permit the passage of the packers therethrough, said shields normally being forced toward each other by the springs and by reason of their being spring actuated and hinged, separating to permit the passage of the bundles of grain and then moving toward each other, under the influence of said springs, to get in front of the bundles to aid in holding the bundles firmly into the shock.

Further objects and advantages of the invention will be set forth in the detailed description which now follows:

In the accompanying drawings, Figure 1 is a plan view of a shocker constructed in accordance with the invention, Fig. 2 is a side elevation thereof, Fig. 3 is a perspective view of the reversing clutch and the elements associated therewith, Fig. 4 is a plan view of the driving mechanism of the binder and chain shafts, Fig. 5 is a perspective view of the bundle carrying chains and packers and associated parts, Figs. 6, 7 and 8 are detail views of a clutch mechanism for controlling the binder shaft, Fig. 9 is a detail view of one of the packers and its actuating crank, Fig. 10 is a detail view of a connecting frame for connecting the frame of the shocker with the frame of the binder, Fig. 11 is a detail view of a clutch for throwing the chains and packers into and out of action, Fig. 12 is a detail view in side elevation of a table carried trip for actuating, when the table is traveling in one direction, the finger supporting yoke and for actuating, when the table is carried in the other direction, a transverse shaft hereinafter described, Fig. 13 is a face view of a shield, Figs. 14 and 15 are edge and plan views respectively, of a board forming the floor of the passageway, Fig. 16 is a detail view of a crank for adjusting the inclination of said board, Figs. 17 and 18 are detail views of a clutch actuating device hereinafter described.

Like numerals designate corresponding parts in all of the figures of the drawings.

In the drawings, 5 designates a portion of a grain binder and 6 designates the rectangular frame of the shocker. This frame is connected to the grain binder by an intermediate frame 7. The frame 7 carries an arm 8 that is actuated by a spring 9 to force an idler roll 10 into engagement with a sprocket chain 11 to thereby prevent undesirable looseness of said chain. This sprocket chain passes over a sprocket wheel 12 upon a shaft 13. Shaft 13 is one of the shafts of the grain binder and motion is imparted from this shaft to the longitudinal shaft 14 of the shocker through the medium of a sprocket wheel 15.

As has hereinbefore been set forth, the invention comprises a slidably mounted table which, during the time the shock is formed, stands beneath the shock forming arms. After the shock is formed and is ready to be discharged, mechanism (hereinafter described) causes the table to travel into the frame and to leave the bundles, comprising the shock, resting upon fingers hereinafter described. A complete movement of the table comprises its travel into the frame and out again to shock forming position.

The table referred to is indicated in the drawings by the reference character 16 and it is slidably mounted to travel in the frame 6. Longitudinal motion is imparted to the table by sprocket chains 17, to the under flights of which the forward end of the table is attached. These sprocket chains pass over sprocket wheels 18 and 19, the latter of which are mounted upon a transverse shaft 20. Shaft 20 carries a bevel gear wheel 21 which is in mesh with bevel gear wheels 22 and 23. These latter gear wheels are loose upon shaft 14.

A clutch 24 is splined upon shaft 14 and is adapted to be thrown into engagement with gear wheel 22 or 23 through the medium of a lever 25. This lever is pivoted at 26 upon frame 6 and its free end engages clutch 24. A latch 27 is pivoted upon a post 28 and is normally held into engagement with lever 25 by a spring 29.

The driver of the grain binder may release this latch by pulling upon a cord or cable 30 which passes over an idler pulley 31 (see Fig. 3).

A slotted link 32 engages a pin 33 carried by lever 25, said slot providing a lost motion connection between said link and said pin. A roller 34 is carried by the lower end of this pin and this roller is controlled by a spring actuated cam 35. This cam is mounted upon the end of a rod 36, said rod being slidably mounted in eyelets 37. A spring 38 bears between one of these eyelets and a collar 39 carried by rod 36, and normally tends to force the cam toward the roller.

The operation of this portion of the structure is as follows: With the parts in the position shown in Figs. 1 and 3, the trip lever 27 is in engagement with lever 25 and the cam 35 is, under the action of spring 38, tending to force the roller 34 and consequently the lever 25 toward the right in Fig. 1, to thereby bring clutch 24 into engagement with gear wheel 23, which action will start shaft 20 and cause the sprocket chains 17 to draw the table into the frame and from beneath the shock. It is apparent, therefore, that when the driver of the grain binder trips lever 27, such action will take place. That is, the table will be caused to travel into the frame. When the table reaches its limit of movement into the frame, however, it acts through mechanism, hereinafter described, to impart a partial rotation to a transverse shaft 40. This shaft carries a crank 41 with which one end of the link 32 is engaged and when this shaft is actuated, the link and lever 25 are moved toward the left in Fig. 1 to bring the clutch into engagement with gear wheel 22, thereby reversing the movement of shaft 20 and causing the table to travel out again. This movement of the lever 25 to the left, it is apparent, will be against the action of the spring actuated cam 35 and the roller 34 will be moved to the opposite side of the nose of said cam so that after this roller once passes the nose of the cam, the cam will act to hold the clutch into engagement with gear wheel 22. When the table reaches its limit of outward movement, it acts through mechanism, hereinafter described, to impart a reverse movement to transverse shaft 40 to draw the link 32 toward the right. This again pulls lever 25 toward the right until the roller 34 again passes the nose of the cam. The action of the cam would then cause the lever 25 to move over to bring the clutch into engagement with the gear wheel 23 if it were not for the fact that the trip 27 engages the lever and prevents such complete movement. In other words, the movement continues until the clutch reaches a neutral position, whereupon the trip engages it and prevents it from moving farther until the driver again releases said trip. To hold the transverse shaft 40 in either of its positions, a rod 42 is slidably mounted in a block 43 and is normally forced outward by a spring 44 which bears between said block and nuts 45 threaded upon said rod, and by which nuts the tension of the spring may be adjusted. This rod has a bifurcated outer end 46 which is pivoted to a crank 47 fast upon shaft 40. Consequently when this crank moves beyond the center in either direction, it is held in the position to which it moves by the action of said spring.

It will be understood that the shocker travels bodily with the grain binder and for this purpose it is mounted upon ground wheels 48 and when the bundles are delivered from the grain binder to the shocker, they fall into a passageway 49, the bottom of which is formed by a board 50 and the sides of which are formed by frame members 51 and sheet metal coverings therefor indicated at 52.

The elements for carrying the bundles rearwardly to the shock forming arms comprise lower sprocket chains 53 and upper sprocket chains 53ª, these sprocket chains carrying prongs 54 to permit of their efficient engagement with the bundles.

To prevent the bundles from being discharged entirely over the outer frame member 51, I arrange a pair of upstanding arms 51ª in such position as to intercept the bundles and to direct them into the passageway 49.

To insure the butt end of the bundle being carried down into engagement with the lower sprocket chains, I provide an endless canvas butter 55 to which motion is imparted by bevel gearing 56 from one of the forward vertical shafts 57 upon which the forward sprocket wheels 58 for the lower sprocket chains are mounted.

To prevent the top of the bundle from falling over before it is properly engaged by the upper sprocket chains, spring fingers 59 are carried by the vertical shafts 60 upon which the sprocket wheels 61 for the forward ends of the upper sprocket chains are mounted. These spring fingers project into the path of the bundle but they do not move with the shafts 60. They are merely supported thereby, and these fingers yield to permit the bundle to pass, after which they spring back into position.

To form a throat and to thereby permit of the more ready engagement of the bundles by the lower sprocket chains, these sprocket chains are arranged slightly divergent at their front ends as is clearly illustrated in Fig. 1. The necessary movement is imparted to the sprocket chains through the rear vertical shafts 62, these shafts in turn being driven by the bevel gears 63 from transverse shaft 64 and this shaft 64 being in turn driven through bevel gears 65, 65′, from the longitudinal shaft 14.

A clutch 66 which will be more specifically described hereinafter, is arranged when the table starts forward, to disconnect gear 65′ from shaft 14 so that during the movement of the table, the chains and the packers 67′, hereinafter described, will be stopped. These packers are driven from cranks 67 formed in shafts 62 and the rear ends of the packers are pivoted to links 68 which links in turn are pivoted to the frame members 51. Therefore, when the shafts 62 are rotated, an alternate thrusting movement is imparted to these packers to crowd the bundles into the shock forming arms.

Shields 69 are pivoted at 70 to the frame members 51 and these shields have slots 71 formed in them to permit the packers to act through said shields. Normally, these shields are held in the position illustrated in Fig. 1, by springs 72 which bear between the rear portions of said shields and the side frame members 51. As the bundles are carried along by the prongs 54, the shields yield inwardly to permit the bundles to pass therebetween and after each bundle passes, the shields move outwardly to cause their angular ends 73 to engage behind the bundles and aid in forming and maintaining a tight shock.

Vertical shafts 74 carry the shock forming arms 75. These shafts carry cranks 76 that are connected by links 77 with an operating rod 78. This operating rod is connected by a link 79 with a crank 80 of transverse shaft 40 and these connections act when the table reaches its forward limit of movement and the transverse shaft is given a partial rotation, to move the operating rod rearwardly or to the right in Fig. 1 and to thereby swing the shock forming arms open to release the shock.

I have found that it is highly desirable to tie a string around the top of the shock to aid in maintaining the formation of the shock when the shock is seated upon the ground. To that end, I have connected with shaft 14 through the medium of spur gears 81 and 82, a shaft 83 which drives through a bevel pinion 84 a bevel gear wheel 85 that is fast upon a binder head shaft 86. Upon the upper end of this shaft 86 is a bevel gear wheel 87 which meshes with a bevel pinion 88 that drives a knotter, indicated at 89. The detail construction of this knotter has not been shown for the reason that it is of a type well known in the art and I deem it sufficient for the purposes of the present invention to merely indicate the position of the same and to show a driving means extended thereto from the remainder of the mechanism. A needle 90 acts in conjunction with the knotter in the usual and well known manner, this needle being mounted upon the upper end of a needle shaft 91 and being operated through a crank 92 and link 93, said link being pivotally connected at 94 to the underside of the gear wheel 85, so that as this gear wheel rotates, the necessary swinging movement is imparted to the needle 90.

Disposed within the length of the shaft 83 is a clutch 95 which, through means hereinafter described, is released to set the knotter or binding mechanism in motion when the table starts forward, said binding mechanism being automatically stopped after the operation of tying the string around the top of the shock has been performed. The means for accomplishing this will be hereinafter described.

The transverse shaft 40 carries cranks 96 and 97 and the free ends of these cranks carry pins 98. The cranks 96 and 97 are connected by rods 99 with levers 100. These levers are secured to pivots 101 and these pivots in turn carry arms 102 that are connected by links 103 with arms 104, the latter being pivoted at 105 to the frame 6.

Depending from the free ends of arms 104 are the side members of a U-shaped yoke 106, the body portion of which extends transversely beneath the fingers 107 said fingers being pivoted at 108 to a bracket 109.

The operation of this part of the structure is as follows: When a partial rotation is imparted to the transverse shaft 40 to pull forwardly upon rods 99, the arms 100 and 102 are pulled forwardly to cause link 103 to swing arm 104 upon its pivot 105 to thereby lower the yoke 106 and to permit the fingers 107 to drop to the ground. It will be noted that by virtue of this construction, the yoke is given a direct downward movement and the fingers 107 are so inclined upwardly that when they strike the ground, they set the shock squarely upon its butt in the stubble. When the shaft 40 is moved in the opposite direction, it is apparent that these fingers will be raised through the same connections.

Mounted upon the table and bodily movably therewith (see Figs. 1 and 12), are trip mechanisms comprising body brackets 110 having secured thereto keepers 111 and 112. Levers 113 and 114 are pivoted at 115 and 116 to body brackets 110 and the free ends of these levers are forked at 117 and 118 for engagement respectively with pins 98 of cranks 96 and 97 and pins 119 of arms 100. Therefore, when the table reaches its rearmost limit of movement, the forked ends 118 of levers 114 will act against pins 119 to raise the yoke 106 and fingers 107, and when the table reaches its forward limit of movement, the forked ends 117 of levers 113 will act against the pins 98 to draw upon rods 99 and through the connections described, lower the yoke. The table also carries a stop member 120 which actuates clutch 66 as hereinbefore set forth, to stop the packers and the chains during the time the table is traveling forward and returning to shock forming position. This actuation of the clutch 66 is accomplished as follows: The movable member of the clutch 121 is engaged by a yoke 122 that is pivoted at 123 to a frame member 124. This yoke carries upon its underside a dog 125 that is pivoted at 126 to the yoke. A spring 127 has one end attached to the dog and the other end attached to the yoke. When the stop 120 strikes this dog, the clutch is shifted to disengage the movable member 121 thereof from the fixed member 121' thereof. This movement of the yoke changes the angle at which the stop 120 engages the dog and permits the dog to move over the center to such position that the action may be repeated but in the reverse direction, when the table moves outwardly again and it is desired to again bring the packers and chains into operation.

The board 50 which forms the bottom of the passageway for the grain is adapted to have its inclination adjusted to thereby accommodate the varying lengths of grain by a crank 128, the central portion 128' of which bears against the underside of the board and the portions 128ª of which are journaled in the frame (see Fig. 16). A hand lever 129 has a catch 130 which engages an arcuate rack 131 to adjust the inclination of the board.

The upper face of the gear wheel 85 (see Fig. 4) carries an egg-shaped cam groove 132 in which a roller 133 travels. This roller is carried by a rod 134 which has lost motion engagement with a rod 135 through the medium of ears 136 through which rod 135 passes. A spring 137 bears between one of the ears 136 and a pin 138 carried by the rod 135. The opposite end of the rod 135 (see Fig. 6) is connected to a latch 139 that is pivoted at 140 to a collar 141 that is loose upon shaft 83.

The clutch 95 comprises the two parts 95ª and 95ᵇ and it is to be understood that the shaft 83 is divided by this clutch. That is, the two portions of the shaft separated by the clutch only rotate in unison when the clutch is in operation. To this end the portion 95ᵇ is internally provided with teeth 95ᶜ and the portion 95ª is provided with a pivoted lever 95ᵉ having a nose adapted to engage said teeth and when this nose is in engagement with the teeth, the two parts of the clutch rotate in unison. A spring 95ᵈ normally tends to move this nose into engagement with the teeth 95ᶜ. When the table moves toward the front of the frame, the stop 120 contacts with a lever 142 (see Fig. 6) that is pivoted at 143 in such manner that it will yield when the table is passing rearwardly, but will act, when the table is passing forwardly, to move the nose 139ª of latch 139 from the path of movement of the lever 95ᵉ. Thereupon the spring 95ᵈ acts to bring the nose of lever 95ᵉ into engagement with teeth 95ᶜ and the two parts of the clutch and the two parts of the shaft 83 are caused to rotate in unison. This rotation continues until gear wheel 85 has made a complete revolution. In other words, as soon as rotation starts, the roller 133 is drawn upon by cam 132 to hold the latch out of action until the gear wheel 85 and the cam make a complete revolution, at the end of which revolution, the roller is again moved forwardly to cause the rearmost ear 136 to act through the spring upon the rod 135 to again interpose latch 139 in the path of movement of lever 95ᵉ, so that when this lever contacts with the nose 139ª of the latch, the nose of said lever 95ᵉ is moved out of engagement with teeth 95ᶜ and the gear wheel 85 ceases to revolve. In other words, this action takes place after a complete operation of the binding mechanism and the needle.

It is believed that the operation of the device will be apparent from the foregoing description, but in order that said operation may be perfectly clear, it may be briefly stated in addition, that the bundles discharged from the binder fall into the passageway and are engaged by the prongs upon the chains. The butter 55 acts to carry the butts of these bundles down into the throat formed by the diverging of the lower chains at their front ends.

Carried rearwardly by the chains, past the yielding shield 69, these bundles are forced by the packers tightly into the shock forming arms. After a sufficient number of bundles has been collected, the driver of the grain binder pulls upon the cord or cable to release the trip 27.

Through the connections described, the table travels into the frame and from beneath the bundles, leaving these bundles resting upon fingers 107. During this inward travel, stop 120 acts to trip the clutches 65 and 95 to stop the packers and chains and to set in operation the binding mechanism for tying a string around the top of the shock. At the completion of the inward movement of the table, the stop mechanisms carried thereby impart a partial rotation to shaft 40 to act upon rods 99 to lower the yoke and drop the fingers 107 and simultaneously therewith through the connections 78, 79 and 80, the shock forming arms are swung open and the shock is thereby dropped squarely upon its butt, and left standing in an erect position upon the ground.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a wheeled supporting frame, of coöperating shock forming arms mounted thereon, means for conducting bundles of grain to said shock forming arms, and for raising said bundles to vertical position, packers for forcing the bundles into said shock forming arms, said packers lying and acting in a horizontal plane to engage the vertically disposed bundles, means for driving said conducting means and said packers, means for opening the shock forming arms to discharge the completed shock therefrom, and automatic means for stopping the action of the driving means of the packers and said conducting means during the time that the shock is being discharged.

2. In a device of the character described, the combination with a supporting frame, of a table mounted to reciprocate therein, means for imparting reciprocatory movement to said table, shock forming arms mounted for swinging movement upon said frame above said table, conveying mechanism for conducting the bundles of grain to the shock forming arms, packing mechanism for packing the bundles of grain into the shock forming arms, and means carried by said table for throwing the packers and conveying mechanism out of action during the forward travel of said table.

3. In a device of the character described, the combination with a supporting frame, of a table mounted to reciprocate therein, shock forming fingers supported beneath said table, means for raising and lowering said shock supporting fingers, shock forming arms mounted to swing above said table, an actuating mechanism for said table, said actuating mechanism being manually set in action, means for automatically throwing said actuating mechanism out of action after the table has made a complete movement into the frame and out again, conveying members for conducting the bundles of grain to the shock forming arms, and means carried by said table for throwing said conveying members out of action during the movement of the table.

4. In a device of the character described, the combination with a supporting frame, of a table mounted to reciprocate therein, shock supporting fingers supported beneath said table, means for raising and lowering said shock supporting fingers, shock forming arms mounted to swing above said table, an actuating mechanism for said table, said actuating mechanism being manually set in action, means for automatically throwing said actuating mechanism out of action after the table has made a complete movement into the frame and out again, conveying members for conducting the bundles of grain to the shock forming arms, means carried by said table for throwing said conveying members out of action during the movement of the table, packers for packing the bundles of grain into the shock forming arms, and means for throwing said packers out of action during the movement of the table.

5. In a device of the character described, the combination with a supporting frame, of a table mounted to reciprocate therein, shock supporting fingers supported beneath said table, means for raising and lowering said shock supporting fingers, shock forming arms mounted to swing above said table, an actuating mechanism for said table, said actuating mechanism being manually set in action, means for automatically throwing said actuating mechanism out of action after the table has made a complete movement into the frame and out again, conveying members for conducting the bundles of grain to the shock forming arms, means carried by said table for throwing said conveying members out of action during the movement of the table, a binder operating mechanism, and means for setting said binder operating mechanism in motion upon inward movement of the table and for automatically throwing said binder operating mechanism out of action after the same has made a predetermined movement.

6. In a machine of the character described, the combination with a supporting frame, of a passageway formed longitudinally thereof for the reception of bound bundles of grain, conductors traveling longitudinally in said passageway for engaging said bundles and carrying them through said passageway and a pair of yieldable shields disposed adjacent the rear end of said passageway, said shields comprising rearwardly convergent plane portions and terminal ends projecting outwardly substantially at right angles to said plane portions.

7. In a machine of the character described, the combination with a supporting frame, of a passageway formed longitudinally thereof for the reception of bound bundles of grain, conductors traveling longitudinally in said passageway for engaging said bundles and carrying them through said passageway, a pair of yieldable shields disposed adjacent the rear end of said passageway, said shields comprising rearwardly convergent plane portions and terminal ends projecting outwardly substantially at right angles to said plane portions, and a pair of sets of packers acting in conjunction with said shields.

8. In a machine of the character described, the combination with a supporting frame, of a passageway formed longitudinally thereof for the reception of bound bundles of grain, conductors traveling longitudinally in said passageway for engaging said bundles and carrying them through said passageway, a pair of yieldable shields disposed adjacent the rear end of said passageway, and a pair of sets of packers acting in conjunction with said shields and through openings formed in said shields.

9. In a device of the character described, the combination with a supporting frame, of a table mounted to travel longitudinally therein, means for causing said table to travel into said frame and out again and to come to a position of rest at the termination of said outward movement, pronged shock conveying chains arranged to travel above and longitudinally of said supporting frame, shafts by which said chains are driven, alternately acting packers driven from said shafts, and means for throwing said shafts and packers out of action during the movement of the table.

10. In a device of the character described, the combination with a supporting frame, of a table mounted to travel longitudinally therein, means for causing said table to travel into said frame and out again and to come to a position of rest at the termination of said outward movement, pronged shock conveying chains arranged to travel above and longitudinally of said supporting frame, shafts by which said chains are driven, alternately acting packers driven from said shafts, means for throwing said shafts and packers out of action during the movement of the table, and yieldably mounted shields through which said packers act.

11. In a device of the character described, the combination with a supporting frame, of a table mounted to travel longitudinally therein, means for causing said table to travel into said frame and out again and to come to a position of rest at the termination of said outward movement, pronged shock conveying chains arranged to travel above and longitudinally of said supporting frame, shafts by which said chains are driven, alternately acting packers driven from said shafts, means for throwing said shafts and packers out of action during the movement of the table, a pair of shock forming arms disposed above said fingers, and means for opening said shock forming arms when the table reaches its limit of inward movement.

12. In a device of the character described, the combination with a supporting frame, of a table mounted to travel longitudinally therein, means for causing said table to travel into said frame and out again and to come to a position of rest at the termination of said outward movement, pronged shock conveying chains, shafts by which said chains are driven, alternately acting packers driven from said shafts, means for throwing said shafts and packers out of action during the movement of the table, a pair of shock forming arms disposed above said table, means for opening said shock forming arms when the table reaches its limit of inward movement, a binder and needle actuating mechanism, and means for automatically setting said mechanism in motion during the forward travel of the table.

13. In a device of the character described, the combination with a supporting frame, of a table mounted to reciprocate therein, means for imparting movement to said table comprising mechanism for automatically stopping the table after said table has made a complete movement into said frame and out again, a pair of shock forming arms located above said table, means for conveying the bundles of grain to said shock forming arms, alternately acting packers for packing the bundles into said shock forming arms, a binder and needle operating member, shock supporting fingers disposed beneath said table, and means carried by said table for automatically stopping the conveying mechanism and the packers and for setting the binder and needle operating member in motion upon the forward movement of the table.

14. In a device of the character described, the combination with a supporting frame, of a table mounted to reciprocate therein, means for imparting movement to said table comprising mechanism for automatically stopping the table after said table has made a complete movement into said frame and out again, a pair of shock forming arms located above said table, means for conveying the bundles of grain to said shock forming arms, alternately acting packers for packing the bundles into said shock forming arms, a binder and needle operating member, shock supporting fingers disposed beneath said table, and means carried by said table for automatically stopping the conveying mechanism and the packers and for setting the binder and needle operating member in motion upon the forward movement of the table, and for setting said conveying mechanism and said packers in motion during the outward movement of the table.

15. In a device of the character described, the combination with a supporting frame, of a table mounted to reciprocate therein, means for imparting movement to said table comprising mechanism for automatically stpping the table after said table has made a complete movement into said frame and out again, a pair of shock forming arms located above said table, means for conveying the bundles of grain to said shock forming arms, alternately acting packers for packing the bundles into said shock forming arms, a binder and needle operating member, shock supporting fingers beneath said table, means carried by said table for automatically stopping the conveying mechanism and the packers and for setting the binder and needle operating member in motion upon the forward movement of the table, and for setting said conveying mechanism and said packers in motion during the outward movement of the table, and means for stopping said binder and needle operating member after the same has made a predetermined movement.

16. In a device of the character described, the combination with a supporting frame, of a table mounted to reciprocate therein, means for imparting movement to said table comprising mechanism for automatically stopping the table after said table has made a complete movement into said frame and out again, a pair of shock forming arms located above said table, means for conveying the bundles of grain to said shock forming arms, alternately acting packers for packing the bundles into said shock forming arms, a binder and needle operating member, shock supporting fingers disposed beneath said table, means carried by said table for automatically stopping the conveying mechanism and the packers and for setting the binder and needle operating member in motion upon the forward movement of the table, and for setting said conveying mechanism and said packers in motion during the outward movement of the table, and means for stopping said binder and needle operating member after the same has made a predetermined movement and independently of the movement of the table.

17. In a device of the character described, the combination with a supporting frame, of a table mounted to reciprocate therein, means for imparting movement to said table comprising mechanism for automatically stopping the table after said table has made a complete movement into said frame and out again, a pair of shock forming arms located above said table, means for conveying the bundles of grain to said shock forming arms, alternately acting packers for packing the bundles into said shock forming arms, a binder and needle operating member, shock supporting fingers disposed beneath said table, means carried by said table for automatically stopping the conveying mechanism and the packers and for setting the binder and needle operating member in motion upon the forward movement of the table, and means carried by the table for opening the shock forming arms and lowering the shock supporting fingers at the forward limit of movement of the table.

18. In a device of the character described, the combination with a wheeled supporting frame, of a table mounted to reciprocate therein, means for imparting movement to said table comprising mechanism for automatically stopping the table after said table has made a complete movement into said frame and out again, a pair of shock forming arms located above said table, horizontally traveling pairs of toothed sprocket chains for conducting bound bundles of grain from a grain binder to the shock forming arms, the lowermost of said pairs of chains being longer, and traveling faster than the uppermost of said pairs of chains, thereby operating to raise the bundles to a perpendicular position while they are being carried rearwardly by the said pairs of chains, alternately acting packers mounted in position for placing and packing the bundles into the shock forming arms after the said pairs of chains have reached their rearward limit of movement, means for actuating said pairs of chains and packers, a needle mounted in position to carry a string across the space between the shafts supporting the shock forming arms, a knotter mounted in position to tie the said string, means for actuating said needle, and knotter, shock supporting fingers disposed beneath said table, means carried by the table for simultaneously opening the shock forming arms, and dropping the shock supporting fingers, thereby depositing the shock by dropping it squarely upon its butt into the stubble.

19. In a device of the character described, the combination with a wheeled supporting frame, of a table mounted to reciprocate therein, means for imparting movement to said table comprising mechanism for automatically stopping the table after said table has made a complete movement into said frame and out again, a pair of shock forming arms, horizontally traveling pairs of toothed sprocket chains for conducting bound bundles of grain from a grain binder to the shock forming arms, the lowermost of said pairs of chains being longer and traveling faster than the uppermost of said pairs of chains, thereby operating to raise the bundles to a perpendicular position while they are being carried rearwardly by the said pairs of chains, alternately acting packers mounted in position for placing and packing the bundles into the shock forming arms after they pass from between said chains, means for actuating said pairs of chains and packers, a binder mechanism mounted in position for tying a string around the top of the shock, shock supporting fingers disposed beneath the said table, means carried by the table for simultaneously opening the shock forming arms and dropping the shock supporting fingers when the table has reached its forward limit of movement, to thereby deposit the shock by dropping it perpendicularly and squarely upon its butt into the stubble and means for driving said binder mechanism in synchronism with the packers and shock forming arms.

20. In a device of the character described, the combination with a supporting frame, of a table mounted to reciprocate therein, shock forming arms located above said table, shock supporting fingers located immediately beneath said table, and parallel with the movement of the said table, means carried by the said table for automatically opening the said shock forming arms wide enough to admit of the free passage of the shock, the said means also operating to drop the shock supporting fingers simultaneously with the opening of the shock forming arms, the said shock supporting fingers, when so dropped, lying on, and parallel with the surface of the ground throughout their entire length beneath the said shock.

21. In a device of the character described, the combination with a supporting frame of a table movable into and out of said frame, a rock shaft actuated by the movement of said table, a crank carried by said rock shaft, a rod pivoted to said crank, a bearing through which said rod slides, a spring acting between said bearing and a member mounted on said rod whereby said spring acts to hold said crank at its limit of movement to opposite sides of the center and a clutch shifting element attached to said rock shaft.

In testimony whereof I affix my signature in presence of two witnesses.

MARION G. SLAWSON.

Witnesses:
H. F. GEORGE,
F. P. GRUND.